(12) United States Patent
Fellenser et al.

(10) Patent No.: US 7,210,070 B2
(45) Date of Patent: Apr. 24, 2007

(54) MAINTENANCE INTERFACE UNIT FOR SERVICING MULTIPROCESSOR SYSTEMS

(75) Inventors: Frederick George Fellenser, Paoli, PA (US); Josh David Collier, Upper Providence Township, PA (US)

(73) Assignee: Unisys Corporation, Blue Bell, PA (US)

( * ) Notice: Subject to any disclaimer, the term of this patent is extended or adjusted under 35 U.S.C. 154(b) by 630 days.

(21) Appl. No.: 10/617,924

(22) Filed: Jul. 11, 2003

(65) Prior Publication Data

US 2005/0027897 A1 Feb. 3, 2005

(51) Int. Cl.
*G06F 11/00* (2006.01)

(52) U.S. Cl. .................. 714/43; 712/216; 712/220; 714/13

(58) Field of Classification Search .............. 714/43, 714/56
See application file for complete search history.

(56) References Cited

U.S. PATENT DOCUMENTS

| | | | |
|---|---|---|---|
| 5,815,652 A * | 9/1998 | Ote et al. | |
| 5,850,513 A * | 12/1998 | Whittaker et al. | ............ 714/49 |
| 6,122,756 A * | 9/2000 | Baxter et al. | |
| 6,490,611 B1 * | 12/2002 | Shen et al. | ................. 718/103 |
| 6,539,503 B1 * | 3/2003 | Walker | |
| 6,728,668 B1 * | 4/2004 | Kitamorn et al. | |
| 6,973,547 B2 * | 12/2005 | Nilsson et al. | |
| 6,990,602 B1 * | 1/2006 | Skinner et al. | |
| 7,003,434 B2 * | 2/2006 | Azpitarte | .................... 702/184 |
| 2002/0056063 A1 * | 5/2002 | Nerl | |
| 2002/0112130 A1 * | 8/2002 | Arimilli et al. | |
| 2003/0101381 A1 * | 5/2003 | Mateev et al. | |
| 2003/0110412 A1 * | 6/2003 | Neville | |
| 2003/0131073 A1 * | 7/2003 | Lucovsky et al. | |
| 2004/0102198 A1 * | 5/2004 | Diener et al. | |
| 2004/0123188 A1 * | 6/2004 | Srinivasan et al. | |
| 2004/0230750 A1 * | 11/2004 | Blake et al. | ................ 711/146 |

* cited by examiner

*Primary Examiner*—Scott Baderman
*Assistant Examiner*—Loan Truong
(74) *Attorney, Agent, or Firm*—Mark T. Starr; Werner Axenfeld (57) ABSTRACT

An apparatus containing a maintenance interface unit is described. In one exemplary implementation, the apparatus includes a multiprocessor system and the maintenance interface unit. The multiprocessor system uses cache coherency for accessing memory. The maintenance interface unit is integrated within the multiprocessor system and is configured to provide a backdoor accessibility to the multiprocessor system on-behalf of a peripheral maintenance system. The maintenance interface unit is also configured to perform operations within the multiprocessor system while maintaining the cache coherency.

49 Claims, 5 Drawing Sheets

MAINTENANCE INTERFACE UNIT FOR SERVICING MULTIPROCESSOR SYSTEMS

TECHNICAL FIELD

The present invention relates to multiprocessor systems, and more particularly, to maintaining and servicing multiprocessor systems.

BACKGROUND

Many computer systems are used in fault tolerant environments such as the banking industry, airline industry, mercantile markets, and so forth. In such environments any downtime to a computer system caused by a computer system failure can be catastrophic to businesses and customers that rely on such systems. To safeguard against such failures, many computer systems rely on maintenance systems to monitor the health of the systems and take corrective action in the event problems are detected.

Unfortunately, many of these maintenance systems are unable to precisely diagnose the root cause of a problem or take corrective action fast enough to prevent the computer system from failing. To compound problems further, many maintenance systems monitor the health of computer systems by testing them in a "service mode." Typically, when a computer is placed into a service mode, the normal operational mode of the computer system is interrupted or degraded. Additionally, the service mode creates an artificial testing atmosphere in which problems that may occur in the normal mode of operation never present themselves in the service mode, and hence, may go undetected, possibly jeopardizing the operating stability of the computer system.

SUMMARY

A maintenance interface unit for servicing multiprocessor systems is described. In one exemplary implementation, an apparatus includes a multiprocessor system and a maintenance interface unit. The multiprocessor system uses cache coherency for accessing memory. The maintenance interface unit is integrated within the multiprocessor system and is configured to provide backdoor accessibility to the multiprocessor system on behalf of a peripheral maintenance system. The maintenance interface unit is also configured to perform operations within the multiprocessor system while maintaining the cache coherency.

BRIEF DESCRIPTION OF THE DRAWINGS

The detailed description is explained with reference to the accompanying figures. In the figures, the left-most digit(s) of a reference number identifies the figure in which the reference number first appears.

DETAILED DESCRIPTION

Introduction

To overcome the inefficiencies and problems described in the Background section, the following description, introduces the concept of providing backdoor accessibility to a multiprocessor system from a peripheral maintenance system. Specifically, a maintenance interface unit is integrated within the multiprocessor system to provide the backdoor accessibility between the peripheral maintenance system and the multiprocessor system. The maintenance interface unit participates in cache coherency of the multiprocessor system and is able to access information on behalf of the peripheral maintenance system in the multiprocessor system, non-intrusively, i.e., without interrupting the normal operational mode of the multiprocessor system.

The maintenance interface unit is also responsible for performing autonomous housekeeping operations to respond, in real-time, to anomalies in the multiprocessor system. Accordingly, the maintenance interface unit is often able manage problems as they occur in the multiple processor system, but before they can be reported to the peripheral maintenance system and analyzed. Various other features and advantages shall become more apparent from the following description.

Exemplary Computing Environment

Figure 1:
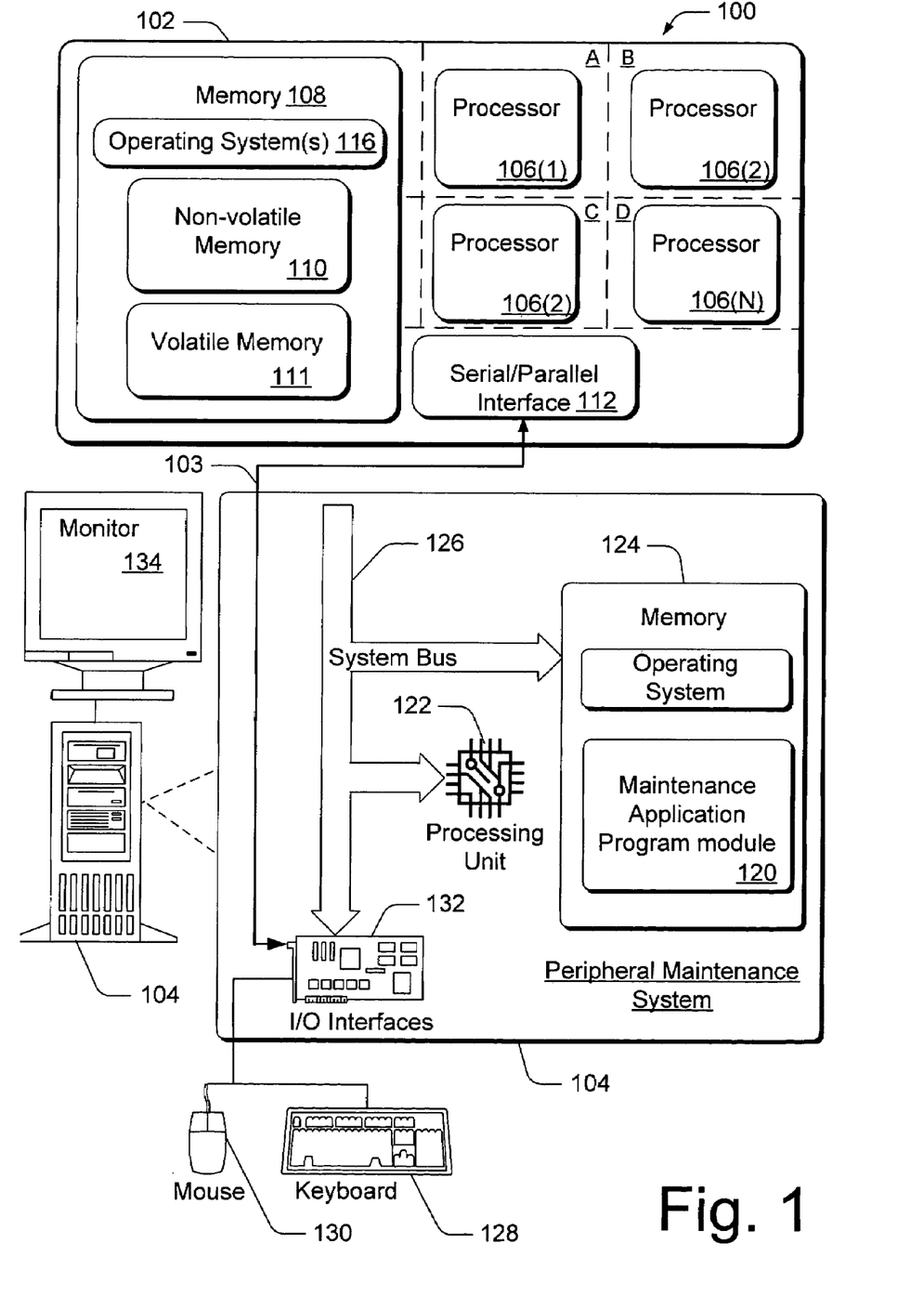
FIG. 1 illustrates an exemplary computing environment in which a multiprocessor system is serviced by a peripheral maintenance system.

FIG. 1 illustrates an exemplary computing environment 100 in which multiprocessor system 102 is serviced by a peripheral maintenance system 104. Multiprocessor system 102 includes processors 106(1), 106(2), 106(3), ..., 106(N). Processors referred to generally as reference number 106 execute various instructions to control the operation of the multiprocessor system 102 and to communicate with other electronic and computing devices. Processors 106 may represent proprietary processors, microprocessors, state-machines, programmable logic devices, and other processing engines.

Multiprocessor system 102 may include memory 108 in a variety of computer readable media. Such media can be any available media that is accessible by multiprocessor system and includes both non-volatile 110 and volatile media 111, in the form of removable and non-removable media. For example, non-volatile media may include read only memory (ROM) and volatile media 111 may include computer readable media in the form of random access memory (RAM). ROM typically contains basic routines used to provide basic functionality to elements in multiprocessor system 102, such as the transfer of information between elements in multiprocessor system 102. RAM typically contains data and/or program modules that are immediately accessible to and/or presently operated on by processors 106, which may include one or more portions of cache.

Memory 108 can also include other removable/non-removable, computer storage media, such as but not limited to, a hard disk drive non-volatile magnetic media, other magnetic storage devices such as a magnetic disk drive, magnetic cassettes, a "floppy disk," optical disks such as a CD-ROM, DVD-ROM, or other optical media. It is to be appreciated that other types memory 108 may be accessible by a multiprocessor system 102 such as, flash memory cards, electrically erasable programmable read-only memory (EEPROM), and so forth.

Although shown herein as a single discrete block within multiprocessor system 102, portions of memory 108 may reside locally within microprocessor system 102 and/or reside remotely from multiprocessor system 102, but be accessible to multiprocessor system 102 via some type of input/output device, such as by a SCSI interface (not shown).

Any number of program modules can be stored in memory 108, including by way of example, one or more operating systems 116. For purposes of illustration, the one or more operating systems are illustrated herein as discrete blocks, although it is recognized that such programs and components may reside at various times in different storage components of multiprocessor system 102, and are executed by one or more of processors 106.

Multiprocessor system 102 also may include a serial/parallel interface 112, which provides a data communication path directly between multiprocessor system 102 and another electronic or computing device, such as peripheral maintenance system 104.

General reference is made herein to a multiprocessor system, such as multiprocessor system 102. As used herein, "multiple processor" or "multiprocessor system" means any class of computer systems that utilize more than one processor to execute instructions or perform operations. For example, multiprocessor system 102 may refer to, but is not limited to, servers, routers, mainframe computers, enterprise servers, and other devices that utilize more than one processor. Although specific examples may refer to one or more of these multiple processor systems, such examples are not meant to limit the scope of the claims or the description, but are meant to provide a specific understanding of the described implementations.

It is also appreciated that multiprocessor system may include one or more logical partitions represented as A, B, C, and D in FIG. 1. Each partition may include one or more processors 106 that logically operate separately from other processors 106 operating in other partitions. For instance, in the exemplary illustration, processor 106(1) operates in partition A, processor 106(2) operates in partition B, processor 106(3) operates in partition C, and one or more processors 106(N) operate in partition D. Each partition and its constituent processor(s) are dedicated to executing different operating systems and may utilize different portions of memory than other partitions. For example, suppose that a multiprocessor system contains 32 processors and is able to run eight separate operating systems simultaneously. Such a system may be divided into eight separate logical partitions. Each partition including four processors, all dedicated to executing one of the eight operating systems. It is recognized that various quantities of processors, partitions, and/or operating systems could be designated per logical partition.

It is also to be appreciated that additional components can be included in multiprocessor system 102. For example, additional processors or storage devices, additional I/O interfaces, and so forth may be included in multiprocessor system 102.

It is also recognized that there are a variety of system busses, point-to-point connections, and various other connection configurations that may be used to connect the various components within multiprocessor system 102 and for purposes of this discussion any of these variety of configurations may be included.

Peripheral maintenance system 104 represents any general purpose or special purpose computing system, such as but not limited to, personal computers, server computers, multiprocessor systems, mainframe computers, and the like. Peripheral maintenance system 104 includes a maintenance application program module 120 that may be described in the general context of computer-executable instructions, such as program modules, being executed by a computer (i.e., processor(s) operating on one or more computers). As shall be described in more detail below, maintenance application program module 120 provides the ability for peripheral maintenance system 104 to initialize, service, and maintain multiprocessor system 102. Generally, program modules like application program module 120 include routines, programs, objects, components, data structures, etc. that perform particular tasks or implement particular abstract data types.

The components of peripheral maintenance system 104 can include, but are not limited to, one or more processors or processing units 122, a system memory 124, and a system bus 126 that couples various system components including the processor(s) 122 to memory 124.

Memory 124 typically includes a variety of computer readable media. Such media can be any available media that is accessible by peripheral maintenance system 104 and includes both volatile and non-volatile media, removable and non-removable media. The computer-readable media provide non-volatile storage of computer readable instructions, data structures, program modules, and other data for system 104. Any number of program modules can be stored in the computer readable media of memory 124, including one or more portions of maintenance application program module 120. It is also noted that portions of program module 120 may be stored in a remote memory storage device remote from peripheral maintenance system 104. Additionally, even though program module 120 is illustrated herein as a discrete block, it is recognized that its components may reside at various times in different storage components of the peripheral maintenance system 104 and are executed by processors of a computer, such as processing units 122.

A user can enter commands and information into peripheral maintenance system 104 via input devices such as a keyboard 128 and a pointing device 130 (e.g., a "mouse"). Other input devices (not shown specifically) may include a microphone, a joystick and/or the like. These and other input devices are connected to the peripheral maintenance interface unit 104 via input/output interfaces 132, such as a parallel port, a universal serial bus (USB), or may be connected remotely through a network or a wireless communication link.

Peripheral maintenance system 104 is connected to multiprocessor system 102 via communication link 103. In particular, communication link 103 connects input/output interfaces 132 of the peripheral maintenance system 103 to serial/parallel interface 112 of multiprocessor system 102. In the exemplary implementation, the communication link 103 is a JTAG (Joint Test Action Group) compatible serial connection, but other communication links may be selected including, but not limited to, parallel connections, network interface connections, and so forth.

A monitor 134 or other type of display device can also be connected to peripheral maintenance system 104 to provide graphical information to a user monitoring the health of multiprocessor system 102. It is noted that peripheral maintenance system 104 can physically reside within the same cabinetry or physical platform as multiprocessor system 102 even though peripheral maintenance system 104 is illustrated as being remotely connected to multiprocessor system via communication link 103.

Maintenance Interface Unit

Figure 2:
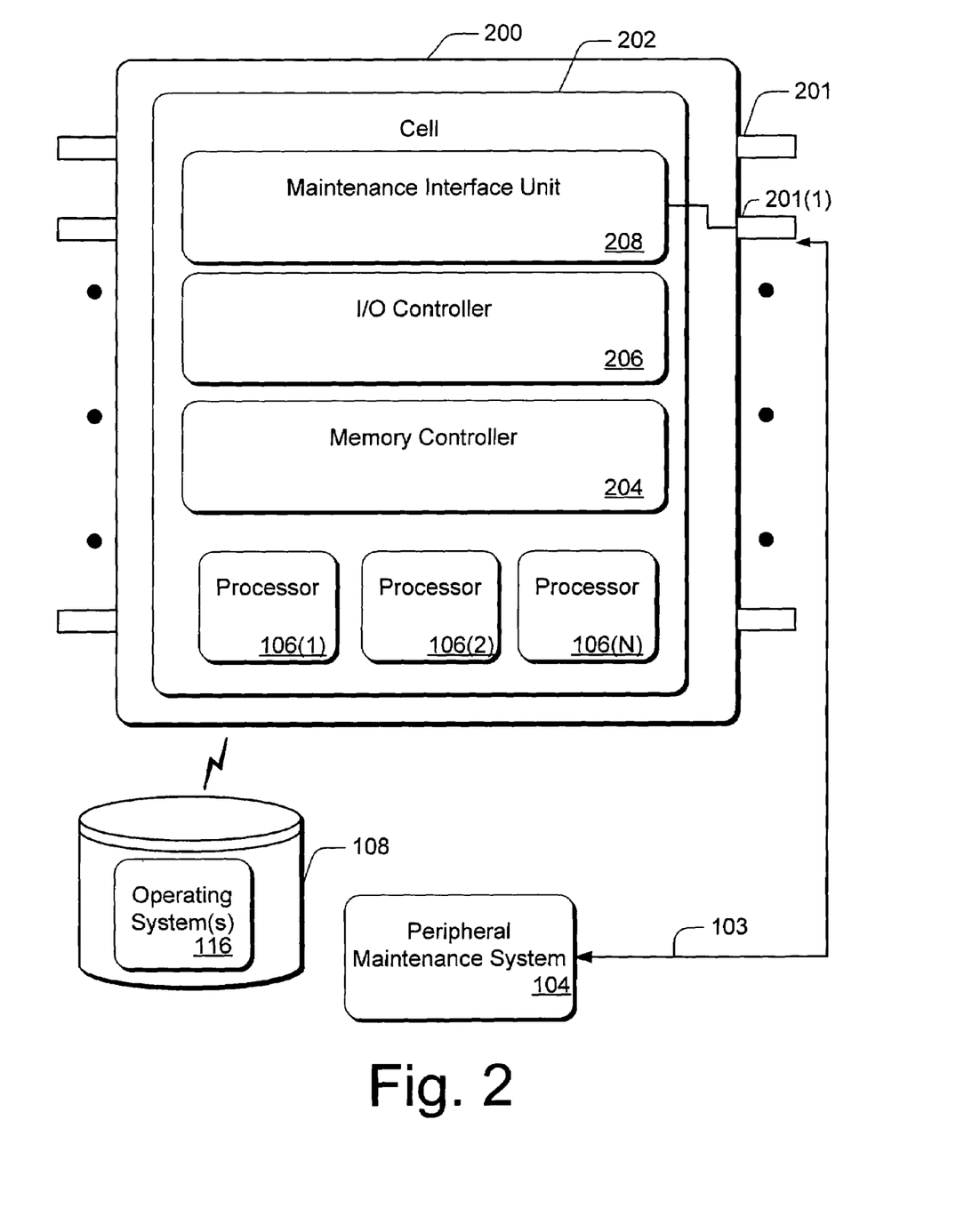
FIG. 2 illustrates various components of a chip in a multiprocessor system.

Having introduced the computing environment 100, it is now possible to describe, more particularly, how multiprocessor system 102 may be serviced and maintained by peripheral maintenance system 104 and/or a maintenance interface unit (to be described). FIG. 2 illustrates various components of a chip 200 in multiprocessor system 102. Multiprocessor system 102 may include more than one chip forming a chip set. Chip 200 may include pins 201, which serve as a footprint to connect chip 200 to a printed circuit board (not shown) or other platforms.

Chip 200 may also include one or more cells 202, which represent a processing unit of multiprocessor system 102. Additional cells may be interconnected and included on chip 202 or on separate chips comprising multiprocessor system 102. In the exemplary implementation, cell 202 is part of an Application Specific Integrated Circuit (ASIC) chip or as one or more ASICs. Alternatively, cell 202 may be implemented in other configurations including FPGA (Field Programmable Gate Array), hybrid circuit and programmable logic technologies, or other hardware-based technology.

Cell 202 includes, processors 106, a memory controller 204, I/O controller 206, and a maintenance interface unit 208. It is appreciated that additional components may be included in cell 202. For example, additional controllers, transportation devices (such as busses and crossbars), or storage devices, additional I/O interfaces, other configurations and so forth may be included in cell 202. It is also appreciated that some components may not be included. For example, I/O controller 206 may not be included.

Multiprocessor system 102 participates in cache coherency, sometimes referred to as a "cache coherent multiprocessor system." "Cache coherency" means when processors 106 access memory 108, memory controller 204 ensures that only one requester at a time is capable of writing data so that each processor 106 receives the most recent version of the data when requesting data; whether stored in memory 108, or other locations such as registers (not shown) located in processors 106. In other words, by participating in cache coherency each processor 106 has access to the same data, and memory controller 204 ensures that the most recent data is not accidentally overwritten or erased by processors attempting to access the same data. Memory controller 204 is depicted as being implemented within cell 202, but may reside outside of cell 202 or be combined with other control units in cell 202.

I/O controller 206 controls the flow of data to and from I/O devices (not shown). That is, I/O controller 206 is implemented in hardware and is used as part of an interface between I/O devices and components in cell 202, such as processors 106. Accordingly, I/O controller 206 is responsible for the flow of data to and from cell 202 to I/O devices. I/O controller 206 is also configured to detect if one or more I/O devices (not shown) are not responding and possibly malfunctioning or shutdown. This may be accomplished in a variety of ways, such as by polling the I/O devices or through hardwired logic in I/O controller 206.

Maintenance interface unit 208 is integrated within cell 202 to perform various autonomous operations in multiprocessor system 102, such as, but not limited to error handling, testing, and monitoring. Maintenance interface unit 208 also provides a backdoor interface for peripheral maintenance system 104 to monitor, service, test and maintain multiprocessor system 102. Thus, maintenance interface unit 208 may (i) serve as a backdoor interface on behalf of peripheral maintenance system 104, and (ii) perform various autonomous operations associated with error handling and other housekeeping operations for multiprocessor system 102.

Maintenance interface unit 208 is connected to peripheral maintenance system 104 via communication link 103. In an exemplary implementation, a serial communication link is used to connect maintenance interface unit 208 (via a particular pin 201(1) of chip 200) to peripheral maintenance unit 104. As mentioned above, however, connections with more bandwidth may be used to connect the maintenance interface unit 208 to peripheral maintenance system 104 depending on packaging technology associated with chip 200 and the quantity of available pins. Maintenance interface unit 208 is connected to components residing in cell 202, such as processors 106, memory controller 204, and I/O controller via point-to-point connections, via one or more busses, a crossbar fabric, and so forth.

Maintenance interface unit 208 is able to access memory 108 including initializing memory, reading data from memory 108 and writing data to memory 108. When accessing memory 108, maintenance interface unit 208, like processors 106, participates in cache coherency. That is, when maintenance interface unit 208 accesses memory 108, memory controller 204 treats maintenance interface unit 208 as if it were a processor 106 and applies the same rules memory controller 204 applies to processors 106 when they access memory 108. Accordingly, maintenance interface unit 208 is configured to participate in cache coherency by issuing requests to memory controller 204 in a similar manner as processors 106. When accessing memory, such as when performing read or write operations, maintenance interface unit 208 makes a request to memory controller 204 to locate the most recent copy of the cache line.

If there is more than one logical partition per multiprocessor system 102 and/or cell 202, one or more memory interface units 208 may be used per partition to monitor and service components in that particular partition. In such an arrangement, the memory interface units may communicate with each other through local messages or via the peripheral maintenance system 104 in the event a problem is detected that would affect other partitions, such as shared devices or memory locations. It is noted, however, that for fault tolerant environments, most logical partitions tend not to share common memory or execute the same operating system to safeguard against the possibility of an anomaly affecting more than one partition.

Figure 3:
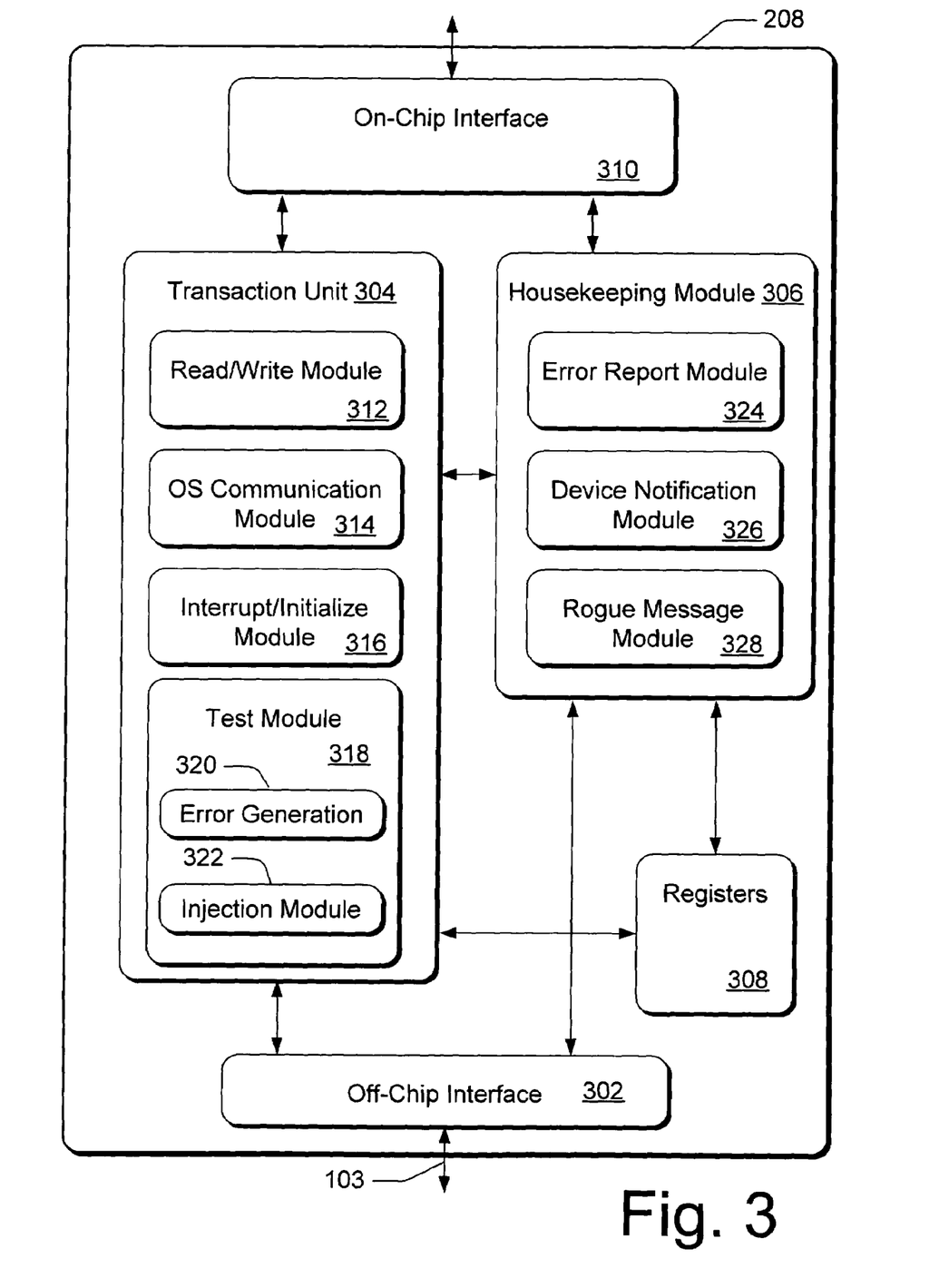
FIG. 3 illustrates various components of an exemplary maintenance interface unit.

FIG. 3 illustrates various components of exemplary maintenance interface unit 208. Maintenance interface unit 208 may include an off-chip interface 302, a transaction unit 304, a housekeeping module 306, registers 308, and an on-chip interface 310. Such componenets may be implemented in the form of a special purpose microprocessor, programmable logic, state-machines, and/or a combination one or more of microprocessor, programmable logic and state-machines.

Off-chip interface 302 is connected to peripheral maintenance system 104 via communication link 103 and is configured to serve as a bi-directional communication interface between peripheral maintenance unit 104 and components located on maintenance interface unit 208. On-chip interface 310 is configured to serve as a bi-directional communication interface between components in cell 202 and components within maintenance interface unit 208. Off-chip interface 302 and/or on-chip interface 310 may include handshaking resources to coordinate the sending and receiving of information to and from maintenance interface unit 208.

Transaction unit 304 is configured to communicate with peripheral maintenance system 104 and perform tasks on-behalf of the peripheral maintenance system. In particular, transaction unit 304 is configured to provide a backdoor for peripheral maintenance system 104 to access multiprocessor system 102. In other words, maintenance interface unit 208, via transaction unit 304, serves as a platform integrated within the multiprocessor system, in which the peripheral maintenance system 104 may access memory 108 vicariously through maintenance interface unit 208, and participate in cache-coherency.

Transaction unit 304 may include a read/write module 312, an operating system communication module 314, interrupt/initialize module 316, and a test module 318. Each of these modules represent logical functionality provided by maintenance interface unit 104 and may be physically integrated as part of one or more state-machines and/or logic.

Read/write module 312 is configured to permit peripheral maintenance system 104 to write data to a specific register or location in memory 108 and/or read data from specific register or location in memory 108, upon receiving particular commands from the peripheral maintenance system 104. In response to such commands, read/write module 312 issues requests to memory controller 204 to either read or write data, hence, participate in cache coherency.

Operating system communication module 314 configured to permit peripheral maintenance system 104 to communicate with one or more operating systems 116 operating in cell 202, upon receiving commands from the peripheral maintenance system 104. Thus, peripheral maintenance system 104 may communicate with one or more operating systems 116 operating in multiprocessor system 102 via maintenance interface unit 208.

Interrupt/initialize module 316 is configured to issue interrupt and/or initialization commands to multiprocessor system 102 in response to instructions received from the peripheral maintenance system 104. For instance, peripheral maintenance system 104 may initialize one or more locations in memory 108 or act as a remote BIOS for multiprocessor system 102 via maintenance interface unit 208. Interrupt/initialize module 316 is also configured to reboot and/or abort processes in multiprocessor system 102, in response to commands issued by peripheral maintenance system 104.

Test module 318 is configured to perform testing on behalf of peripheral maintenance system 104 upon receiving particular commands from system 104. Test module 318 includes an error generation module 320 and an injection module 322. Peripheral maintenance system 104 is able to test what happens when artificial error messages or conditions are propagated into multiprocessor system 102. Error generation module 320 is configured to generate and issue such error messages or conditions upon receiving appropriate command(s) from system 104. Peripheral maintenance system 104 is also able to test what happens when a voluminous quantity of artificial requests are pumped into the multiprocessor system 102. Injection module 322 is configured to inject a stream of artificial requests into multiprocessor system 102 upon receiving appropriate command(s) from system 104.

Housekeeping module 306 autonomously performs housekeeping operations in multiprocessor system 102. As used herein, housekeeping refers to operations generally not handled by other components in cell 202 which pertain to maintaining the health of multiprocessor system such the handling of error conditions. In other words, housekeeping module 306 is responsible for performing autonomous housekeeping operations in response to real-time to anomalies detected in multiprocessor system 102 to prevent them from potentially causing a system wide failure or a significant degradation in system performance. Housekeeping module 306 includes an error report module 324, a device notification module 326, and a rogue message module 328.

Error report module 324 is configured to automatically notify peripheral maintenance system if an error condition (i.e., anomaly) is detected in multiprocessor system. Typically, when an error condition is detected in multiprocessor system 102, details about the error are recorded in registers 308. These details may include the source of the error, type of error, time of error, and other related parameters. Error report module 324 may store the details in registers 308 in the order they are received such as in a first-in-first-out basis. Alternatively, error report module 324 may prioritize the order the details are stored in registers 308, based upon the severity of the anomaly. For instance, more severe error conditions, which may pose a greater risk to the operational integrity of system 102, may be prioritized ahead of less urgent problems. When peripheral maintenance system 104 is available to receive the errors, error report module 324 is configured to transfer them to off-chip interface 302 for transmission to peripheral maintenance system 104.

Device notification module 326 is configured to recognize when a device and/or operating system(s) 116 is not available, and automatically notify peripheral maintenance system 104 of the unavailability. For instance, suppose I/O controller 206 detects that a particular I/O device is non-responsive. I/O controller 206 will send a message to device notification module 326 identifying the particular I/O device that is unavailable. In response device notification module 326 notifies peripheral maintenance system 104 of the particular I/O device that is unavailable via off-chip interface 302.

Additionally, device notification module 326 is configured to automatically notify peripheral maintenance system 104 when it recognizes that a particular operating system 116 is unavailable. For instance, device notification module 326 may poll one or more operating systems 116 to make sure that they are operating efficiently. If the device notification module 326 does not receive a response in a timely manner, device notification module 326 may deduce that the particular operating system has either failed or is faltering and notify the peripheral maintenance system 104 accordingly.

Additionally, device notification module 326 is configured to automatically notify other devices in multiprocessor system 102 when it recognizes that a particular I/O device is unavailable. For instance, device notification module 326 broadcasts a message to other elements in the multiprocessor 102 to notify them of the particular I/O device that is unavailable. In the event that messages have already been sent by other elements in system 102 prior to the notification, device notification module 326 is designated to receive such messages from I/O controller 206 in lieu of the unavailable device. In other words, I/O controller 206 will route pending messages sent to the unavailable I/O device to maintenance interface unit 208. On-chip interface 310 interface routes the pending messages to device notification module 326. Device notification module 326 responds to the senders of such messages indicating that the targeted device is unavailable so that the senders of such messages do not deadlock waiting for a response to the messages. Device notification module 326 may also send a notification to memory controller 204 to take corrective action to clean up any accesses that I/O controller 206 was in the process of accessing.

Rogue message module 328 is configured to receive a rogue message via on-chip interface 310 and automatically respond to an entity within the multiprocessor system 102 that generated the rogue message. "Rogue message" as used herein means any unsolicited message that cannot be deciphered by the other devices in multiprocessor system 102. For example, suppose processor 106(1) generates a message to a non-existent device. The message is routed to maintenance interface unit 208 from any one of the devices that may receive it, such as memory controller 204, I/O controller 206, etc., since neither memory controller 204 nor I/O controller 206 are unable to recognize how to respond to the message. In turn, rogue message module 328 receives the rogue message from on-chip interface 310 and automatically responds to the sender of the rogue message (if the sender can be identified) indicating that the message was sent in error. Additionally, rogue message module 328 may send a copy of the message to error report module 324 to log details about the rogue message in registers 308, for eventual transfer to peripheral maintenance system 104.

Methods for a maintenance interface unit may be described in the general context of programmable logic, state-machines, specially programmed microprocessors, and other suitable hardware techniques. For example, maintenance interface unit 208 (FIG. 2) obtains its functionality through state machines and combinatory logic programmed into chip 200.

Figure 4:
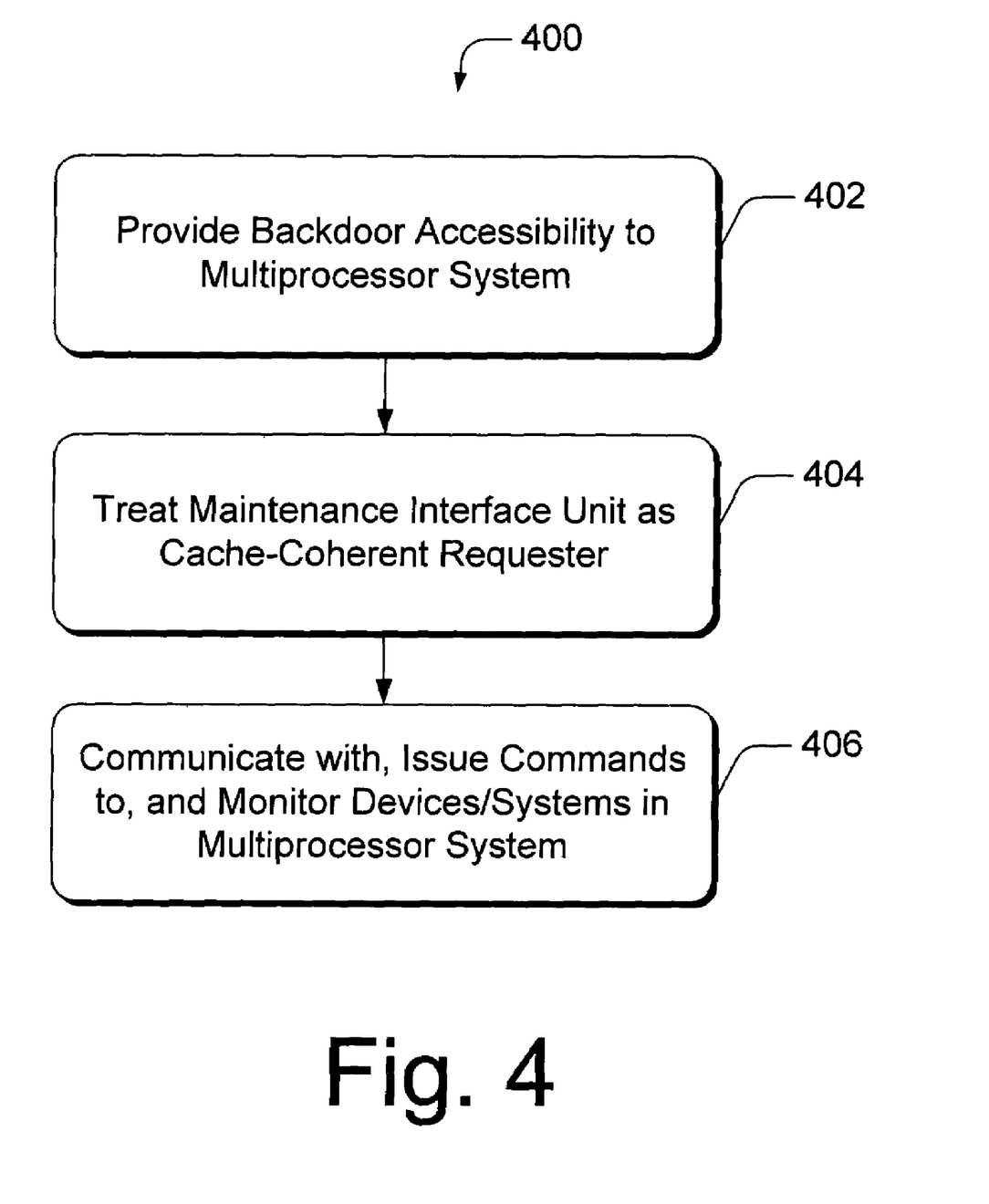
FIG. 4 illustrates a method for a maintenance interface unit.

FIG. 4 illustrates a method 400 for a maintenance interface unit. Method 400 includes blocks 402–406. The order in which the method is described is not intended to be construed as a limitation, and any number of the described method blocks can be combined in any order to implement the method.

In block 402, a maintenance interface unit is integrated in a multiprocessor system to provide backdoor accessibility to the multiprocessor system on behalf of a peripheral maintenance system. For example, maintenance interface unit 208 provides backdoor accessibility to multiprocessor system 102 for peripheral maintenance system 104.

In block 404, a maintenance interface unit is treated as one of the processors or equivalent requester, to enable participation in cache coherency. For example, when accessing memory, maintenance interface unit 208 participates in cache coherency. That is, memory controller 204 treats maintenance interface unit 208 as any other requester in multiprocessor system 102 that participates in cache coherency and snoops for the latest version of data from memory 108 in response to a memory request. Once the latest version of the cache line (i.e., latest version of data from memory 108) is located, the memory request (i.e., read, write, etc.) can be performed on half of the peripheral maintenance system 104 via maintenance interface unit 208.

In block 406, a maintenance interface unit communicates with multiprocessor system 102. In particular, a maintenance interface unit issues commands to a multiprocessor system and monitors devices and systems integrated within the multiprocessor system while participating in cache coherency, without having to interrupt the multiprocessor system. For example, maintenance interface unit 208 includes transaction unit 304 and housekeeping module 306, configured to monitor, test, and service multiprocessor system 102.

Methods for Peripheral Maintenance System

Methods for a peripheral maintenance system may be described in the general context of computer-executable instructions. For example, peripheral maintenance system 104 (FIG. 1) obtains its functionality through a maintenance application program module 120 (FIG. 1) in the form of computer-executable instructions. Generally, computer-executable instructions include routines, programs, objects, components, data structures, and the like that perform particular functions or implement particular abstract data types. The described methods may also be practiced in distributed computing environments where functions are performed by remote processing devices that are linked through a communications network. In a distributed computing environment, computer-executable instructions may be located in both local and remote computer storage media, including memory storage devices.

Figure 5:
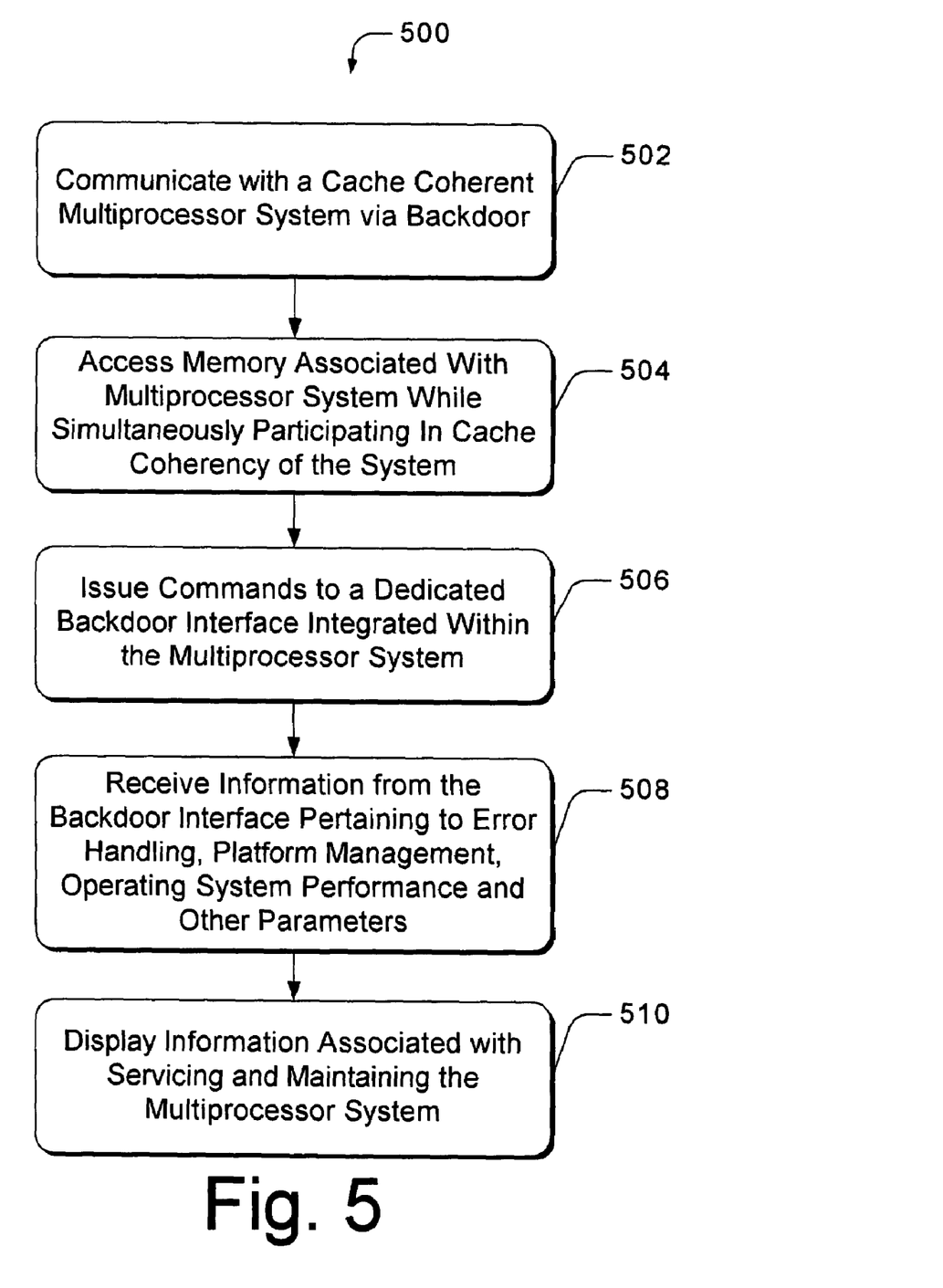
FIG. 5 illustrates a method to implement a maintenance application program module for a peripheral maintenance system.

FIG. 5 illustrates a method 500 to implement a maintenance application program module for a peripheral maintenance system. Method 500 includes blocks 502–510. The order in which the method is described is not intended to be construed as a limitation, and any number of the described method blocks can be combined in any order to implement the method. Furthermore, the method can be implemented in any suitable hardware, software, firmware, or combination thereof.

In block 502, a peripheral maintenance system communicates with a cache coherent multiprocessor system via a backdoor interface embedded within the multiprocessor system. For example, peripheral maintenance system 104 communicates with multiprocessor system 102 via maintenance interface unit 208. In this example, maintenance interface unit 208 serves as the backdoor interface for peripheral maintenance system 104.

In block 504, a peripheral maintenance system accesses memory in the multiprocessor system while simultaneously participating in cache coherency of the multiprocessor system. For example, peripheral maintenance system 104 accesses memory 108 in multiprocessor system 102 by issuing memory requests to maintenance interface unit 208. In response, maintenance interface unit 208 accesses memory 108 on behalf of peripheral maintenance system 104. When accessing memory, maintenance interface unit 208 participates in cache coherency. That is, memory controller 204 treats maintenance interface unit 208 as any other requester in multiprocessor system 102 that participates in cache coherency and snoops for the latest version of data from memory 108 in response to a memory request. Once the latest version of the cache line (i.e., latest version of data from memory 108) is located, the memory request (i.e., read, write, etc.) can be performed on half of the peripheral maintenance system 104 via maintenance interface unit 208. Accordingly, peripheral maintenance system 104 is able to participate in cache coherency.

In block 506, a peripheral maintenance system issues commands to a dedicated backdoor interface integrated within a multiprocessor system. For example, peripheral maintenance system 104 issues commands to maintenance interface unit 208. In particular, some of the commands that peripheral maintenance system 104 may issue to maintenance interface unit include, but are not limited to, injecting error condition(s) into the multiprocessor system, injecting a plurality of artificial requests into the multiprocessor system, interrupting the processes running on multiprocessor system 102, initializing or rebooting multiprocessor system 102 such as at start-up, scrubbing particular memory locations in system 102, and so forth.

In block 508, a peripheral maintenance system receives information from a dedicated backdoor interface integrated within a multiprocessor system. The information may pertain to error handling, platform management, operating system performance, and other serviceability and maintenance information. For example, peripheral maintenance system 104 receives information from maintenance interface unit 208, including but not limited to, indicating that a device or operating system may have failed, rouge messages and possible source(s) for such messages, and other diagnostically useful information for maintaining a multiprocessor system.

In block 510, a peripheral maintenance system displays information on a display device with respect to monitoring and maintaining performance of a multiprocessor system. Such information may include any of the information described above with respect to blocks 502 through 508. For example, peripheral maintenance system 104 may display information on a monitor 134 (FIG. 1) relating to maintaining system 102. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus, comprising: a multiprocessor system that uses cache coherency for accessing memory; and a maintenance interface unit integrated within the multiprocessor system configured to (i) provide a backdoor access to the multiprocessor system on-behalf of a peripheral maintenance system and (ii) perform operations within the multiprocessor system while participating in the cache coherency wherein at least one of the operations performed by the maintenance interface unit includes handling a rogue message.

2. The apparatus as recited in claim 1, wherein the apparatus includes one or more chips.

3. The apparatus as recited in claim 1, wherein the backdoor interface is integrated on a chip comprising part of the multiprocessor system, and the peripheral maintenance system is coupled to the multiprocessor system via the backdoor interface, but is not integrated on the same chip as the backdoor interface.

4. The apparatus as recited in claim 1, wherein the maintenance interface unit is further configured to permit the peripheral maintenance processor to read and/or write to memory while maintaining cache coherency.

5. The apparatus as recited in claim 1, wherein the maintenance interface unit is further configured to permit the peripheral maintenance processor to communicate with one or more operating systems functioning in the multiprocessor system.

6. The apparatus as recited in claim 1, wherein the maintenance interface unit is further configured to permit the peripheral maintenance processor to initialize the multiprocessor system.

7. The apparatus as recited in claim 1, wherein the maintenance interface unit is further configured to automatically notify the peripheral maintenance processor if an error condition is detected in the multiprocessor system.

8. The apparatus as recited in claim 1, wherein at least one of the operations performed by the maintenance interface unit includes recognizing when a device and/or operating system is not available and automatically notifying the multiprocessor system of the unavailability.

9. The apparatus as recited in claim 1, wherein at least one of the operations performed by the maintenance interface unit includes recognizing when a device and/or operating system is not available, automatically notifying the multiprocessor system of the unavailability, and automatically notifying the peripheral maintenance processor of the unavailability.

10. The apparatus as recited in claim 1, wherein at least one of the operations performed by the maintenance interface unit includes issuing an interruption command to the multiprocessor system.

11. An apparatus, comprising: a multiprocessor system that uses cache coherency for accessing memory; and a maintenance interface unit integrated within the multiprocessor system configured to (i) provide a backdoor access to the multiprocessor system on-behalf of a peripheral maintenance system and (ii) perform operations within the multiprocessor system while participating in the cache coherency, wherein at least one of the operations performed by the maintenance interface unit includes receiving a rogue message and automatically responding to an entity within the multiprocessor system that generated the rogue message.

12. An apparatus, comprising: a multiprocessor system that uses cache coherency for accessing memory; and a maintenance interface unit integrated within the multiprocessor system configured to (i) provide a backdoor access to the multiprocessor system on-behalf of a peripheral maintenance system and (ii) perform operations within the multiprocessor system while participating in the cache coherency, wherein at least one of the operations performed by the maintenance interface unit includes receiving a rogue message and automatically notifying the peripheral maintenance processor of the rogue message.

13. The apparatus as recited in claim 1, wherein at least one of the operations performed by the maintenance interface unit includes performing error testing.

14. The apparatus as recited in claim 1, wherein at least one of the operations performed by the maintenance interface unit includes injecting an error condition into the multiprocessor system.

15. The apparatus as recited in claim 1, wherein at least one of the operations performed by the maintenance interface unit includes injecting a plurality of artificial requests into the multiprocessor system to enable the peripheral maintenance processor to monitor performance of the multiprocessor system.

16. A system, comprising: a multiprocessor system that uses cache coherency for accessing memory; a peripheral maintenance system, configured to monitor performance of the multiprocessor system and service the multiprocessor system if aberrations are detected with the performance; and a maintenance interface unit integrated within the multiprocessor system, configured to provide backdoor accessibility to the multiprocessor system on-behalf of the peripheral maintenance system, and perform operations within the multiprocessor system while participating in the cache coherency, wherein at least one of the operations performed by the maintenance interface unit includes handling a rogue message.

17. The system as recited in claim 16, wherein the peripheral maintenance system is coupled to the multiprocessor system via the backdoor interface and is not integrated within the multiprocessor system.

18. The system as recited in claim 16, wherein the maintenance interface unit is further configured to permit the peripheral maintenance processor to read and/or write to memory while maintaining cache coherency.

19. The system as recited in claim 16, wherein the maintenance interface unit is further configured to permit the peripheral maintenance processor to communicate with one or more operating systems functioning in the multiprocessor system.

20. The system as recited in claim 16, wherein the maintenance interface unit is further configured to permit the peripheral maintenance processor to initialize the multiprocessor system.

21. The system as recited in claim 16, wherein the maintenance interface unit is further configured to automatically notify the peripheral maintenance processor if an error condition is detected in the multiprocessor system.

22. The system as recited in claim 16, wherein at least one of the operations performed by the maintenance interface unit includes recognizing when a device and/or operating system is not available and automatically notifying the multiprocessor system of the unavailability.

23. The system as recited in claim 16, wherein at least one of the operations performed by the maintenance interface unit includes recognizing when a device and/or operating system is not available, automatically notifying the multiprocessor system of the unavailability, and automatically notifying the peripheral maintenance processor of the unavailability.

24. The system as recited in claim 16, wherein at least one of the operations performed by the maintenance interface unit includes issuing an interruption command to the multiprocessor system.

25. The system as recited in claim 16, wherein at least one of the operations performed by the maintenance interface unit includes receiving a rogue message and automatically responding to an entity within the multiprocessor system that generated the rogue message.

26. The system as recited in claim 16, wherein at least one of the operations performed by the maintenance interface unit includes receiving a rogue message and automatically notifying the peripheral maintenance processor of the rogue message.

27. The system as recited in claim 16, wherein at least one of the operations performed by the maintenance interface unit includes performing error testing.

28. The system as recited in claim 16, wherein at least one of the operations performed by the maintenance interface unit includes injecting an error condition into the multiprocessor system.

29. The system as recited in claim 16, wherein at least one of the operations performed by the maintenance interface unit includes injecting a plurality of artificial requests into the multiprocessor system to enable the peripheral maintenance processor to monitor performance of the multiprocessor system.

30. In a multiprocessor system that uses cache coherency for accessing memory, a method comprising: providing a backdoor access to the multiprocessor system on-behalf of a peripheral maintenance system, the backdoor access integrated within the multiprocessor system in the form of a maintenance interface unit; treating the maintenance interface unit as one of the processors in the multiprocessor system to enable participation in the cache coherency; logging a rogue message automatically; and notifying the peripheral maintenance processor of the rogue message automatically.

31. The method as recited in claim 30, where treating the maintenance interface unit as one of the processor in the multiprocessor system further permits the maintenance interface unit to (i) communicate with, (ii) issue commands to, and (iii) monitor other devices and systems integrated within the multiprocessor system while participating in the cache coherency without having to interrupt the multiprocessor system.

32. The method as recited in claim 30, wherein providing the backdoor access and treating the maintenance interface unit as one of the processors in the multiprocessor system further permits the peripheral maintenance system to read, write, and initialize memory via the maintenance interface unit while participating in the cache coherency.

33. The method as recited in claim 30, wherein providing the backdoor access comprises: receiving an indication at the maintenance interface unit that a particular entity within the multiprocessor system is unavailable; notifying the multiprocessor system and the peripheral maintenance system of the unavailable entity; and responding to any messages sent to the unavailable entity after receipt of the indication automatically.

34. The method as recited in claim 30, wherein providing the backdoor access comprises permitting the peripheral maintenance processor to communicate with one or more operating systems functioning in the multiprocessor system.

35. The method as recited in claim 30, wherein providing the backdoor access comprises automatically notifying the peripheral maintenance processor if an error condition is detected in the multiprocessor system.

36. The method as recited in claim 30, wherein the providing the backdoor access comprises injecting an error condition into the multiprocessor system.

37. The method as recited in claim 30, further comprising injecting a plurality of artificial requests into the multiprocessor system via the maintenance interface unit.

38. Integrated within a cache-coherent multiprocessor system, a maintenance interface unit, comprising: a transaction unit, configured to provide a backdoor access for a peripheral maintenance system to the multiprocessor system and perform tasks on-behalf of a peripheral maintenance system in the multiprocessor system while participating in cache coherency of the multiprocessor system without having to interrupt the multiprocessor system, wherein the peripheral maintenance system is not integrated within the multiprocessor system; and a housekeeping module configured to perform housekeeping operations in the multiprocessor system automatically, wherein the housekeeping module comprises a rogue message module configured to receive a rogue message and automatically respond to an entity within the multiprocessor system that generated the rogue message.

39. The maintenance interface unit as recited in claim 38, further comprising an off-chip interface coupled to the peripheral maintenance system, configured to provide a communication link between the peripheral maintenance system and the maintenance interface unit.

40. The maintenance interface unit as recited in claim 38, further comprising an on-chip interface configured to provide a communication link between the maintenance interface unit and components integrated in the multiprocessor system.

41. The maintenance interface unit as recited in claim 38, wherein the transaction unit comprises a read/write module configured to permit the peripheral maintenance processor to read and/or write to memory while maintaining cache coherency.

42. The maintenance interface unit as recited in claim 38, wherein the transaction unit comprises an operating system module configured to permit the peripheral maintenance processor to communicate with one or more operating systems functioning in the multiprocessor system.

43. The maintenance interface unit as recited in claim 38, wherein the transaction unit comprises an initialization module, configured to permit the peripheral maintenance processor to initialize the multiprocessor system.

44. The maintenance interface unit as recited in claim 38, wherein the housekeeping module comprises an error report module configured to automatically notify the peripheral maintenance processor if an error condition is detected in the multiprocessor system.

45. The maintenance interface unit as recited in claim 38, wherein the housekeeping module comprises a device notification module configured to recognize when a device and/or operating system is not available and automatically notify the multiprocessor system of the unavailability.

46. The maintenance interface unit as recited in claim 38, wherein the housekeeping module comprises a device notification module configured to recognize when a device and/or operating system is not available, automatically notify the multiprocessor system of the unavailability, and automatically notify the peripheral maintenance processor of the unavailability.

47. Integrated within a cache-coherent multiprocessor system, a maintenance interface unit, comprising: a transaction unit, configured to provide a backdoor access for a peripheral maintenance system to the multiprocessor system and perform tasks on-behalf of a peripheral maintenance system in the multiprocessor system while participating in cache coherency of the multiprocessor system without having to interrupt the multiprocessor system, wherein the peripheral maintenance system is not integrated within the multiprocessor system; and a housekeeping module configured to perform housekeeping operations in the multiprocessor system automatically, wherein the housekeeping module comprises a rogue message module configured to receive a rogue message, respond automatically to an entity within the multiprocessor system that generated the rogue message, and notify automatically the peripheral maintenance processor of the rogue message.

48. The maintenance interface unit as recited in claim 38, wherein the transaction unit comprises an error generation module, configured to issue artificial error messages within the multiprocessor system to enable the peripheral maintenance system to perform error testing.

49. The maintenance interface unit as recited in claim 38, wherein the transaction unit comprises an injection module, configured to inject a plurality of artificial requests into the multiprocessor system to enable the peripheral maintenance processor to monitor performance of the multiprocessor system.

* * * * *